United States Patent [19]

Ham et al.

[11] 3,714,572
[45] Jan. 30, 1973

[54] ALIGNMENT AND TEST FIXTURE APPARATUS

[75] Inventors: Jack Wesley Ham, Indianapolis, Ind., John Milton Poplin, Indianapolis, Ind.

[73] Assignee: RCA Corporation

[22] Filed: Aug. 21, 1970

[21] Appl. No.: 66,006

[52] U.S. Cl. .........324/158 F, 324/73 PC, 324/158 P
[51] Int. Cl. .........................G01r 31/02, G01r 15/12
[58] Field of Search ..324/158 P, 158 F, 158 R, 73 R, 324/73 AT, 73 PC, 51

[56] References Cited

UNITED STATES PATENTS

| 2,954,521 | 9/1960 | McKee | 324/158 P |
| 3,405,361 | 10/1968 | Kattner et al. | 324/158 P |
| 3,437,929 | 4/1969 | Glenn | 324/158 P |
| 2,859,871 | 11/1958 | Harlow et al. | 324/73 AT |
| 3,564,408 | 2/1971 | Schulz et al. | 324/73 R |

OTHER PUBLICATIONS

Chiou et al.; "Making Decal..."; IBM Tech. Dis. Bull.; Vol. 8, No. 11; April 1966; pg. 1541–1542.

Primary Examiner—Rudolph V. Rolinec
Assistant Examiner—Ernest F. Karlsen
Attorney—Eugene M. Whitacre

[57] ABSTRACT

There is disclosed a fixture for automatically testing circuit boards. The fixture utilizes a plurality of pneumatic cylinders, each of which is selectively activated by a suitable air valve under the control of a sequencing mechanism. The fixture tests a circuit board inserted therein without introducing any substantial capacitance and inductance thereto because of the operation and selection of the pneumatic cylinders.

5 Claims, 6 Drawing Figures

INVENTORS
Jack W. Ham and
John M. Poplin
BY
ATTORNEY

ALIGNMENT AND TEST FIXTURE APPARATUS

This invention relates to test apparatus and, more particularly, to apparatus useful for aligning and testing circuit boards.

Presently there exist many techniques for testing electrical apparatus fabricated in mass production quantities. Such apparatus may include radio and television receivers which utilize signal processing sections operating at relatively high frequencies. An example of such a section is the radio frequency amplifier of the radio and television receiver. The above-noted receiving apparatus is usually fabricated to include a plurality of printed circuit boards or other types of component boards, each individual one of which may be associated with a different receiver signal processing function. Such boards are usually prefabricated on an assembly line prior to insertion into the receiver. For example, the entire radio frequency amplifier for an FM receiver may be fabricated on a single circuit board and prewired by means of a common assembly or production line technique. The circuit board, when completed, is capable of performing RF amplification if suitable operating potentials and input signals are applied thereto. At this stage of the fabrication process, it is desirable to test the circuit board before insertion of the same into the final receiving apparatus.

Accordingly, as indicated, the prior art is replete with many different types of test fixtures which serve to apply signal and operating potentials to such a circuit board assembly. Various measurements are made to determine whether or not the circuit board will adequately respond when placed in its final environment. Such fixtures also enable the operator to adjust coils and capacitors to assure that the respective tuned circuits and other adjustable components are preset at desired values. This then assures proper operation in the final receiving apparatus.

Certain prior art testing fixtures had a plurality of probe or contact points located on a surface of the fixture, which probes would make contact with a certain number of predetermined test points located on the circuit board. The fixture probes would be aligned with the test points when the circuit board was placed in the fixture. The probes would then be activated either with operating potential or signal and measurements taken at various probe positions to determine proper operation. Many such probes were coupled to spring mechanisms to assure that the probe would, in fact, make electrical contact with the test point. In such arrangements, all the necessary probes contacted the plurality of test points simultaneously. In such arrangements, still another factor is that each probe had to contact an appropriate test point on the board with a sufficient amount of contact pressure to assure a good electrical connection. Hence, if a large number of test points were necessary, large contact pressures would flex and bend the boards. In some cases the contact pressures were large enough to prevent board insertion.

Due to the relatively high frequency of operation of certain circuit boards, as for example an RF amplifier board, this simultaneous contact arrangement resulted in placing stray capacitance and inductance on the various points associated with the circuit board. This undesirably affected the correct operating frequency of the various circuitry mounted on the board. The adverse effects caused by the external stray reactance introduced by prior art fixtures were precompensated for. The manufacturer would first test a completely operational board by conventional manual means. This board was tested at the requisite operating voltages and signal frequencies and aligned until it was assured that satisfactory operation of the board would be achieved in the final receiver. The board was then placed in a test fixture and, due to the prior art probes and contact arrangements, was undesirably affected by the above-mentioned stray reactances. The manufacturer then obtained a second set of readings, which would be different than those desired, due to the inherent loading of the board by the stray reactances. This set of readings would then be utilized to align other boards originating from the assembly line. These other boards would therefore provide incorrect readings when compared to those readings that were obtained under normal operation. These incorrect readings took into account the adverse loading effects of the test fixture. In many instances, because of the loading produced and due to the operating frequency of certain of these printed circuit boards, the test procedure was not adequate to determine proper operation of the board in the receiver environment. Therefore, even though many of these printed circuit boards would perform well in the test fixture, they would still require additional trimming in the final receiver assembly.

An apparatus for performing circuit board testing embodying the present invention includes a fixture or a base member having a top surface including a predetermined area thereon which is relatively congruent with the circuit board to be tested. Included within the area are a plurality of holes positioned at predetermined locations, each hole being specified with respect to a particular one of a number of test points associated with said electrical circuit board. Mounted in each hole is a pneumatic cylinder, each of which includes a piston member slideably mounted within said cylinder housing. Coupled to each cylinder is a selectively activated valve which is adapted for coupling to a pneumatic source when activated, and when activated serves to move the piston through the hole in the base member to contact a test point of a circuit board positioned within said predetermined area.

These and other objects of the present invention will become clearer if reference is made to the following specification when read in conjunction with the accompanying figures, in which.

Figure 1:
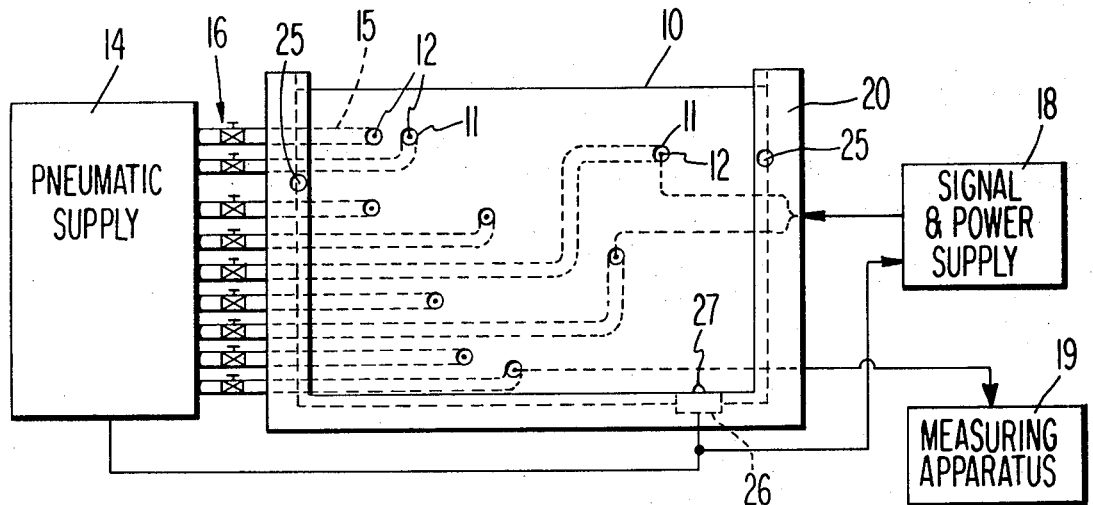
FIG. 1 is a top plan view of a test fixture according to this invention.

Referring to FIG. 1, there is shown an electrical test fixture 10 which may be fabricated from an insulating material such as bakelite and is generally of a hollow rectangular configuration. Such material for fixture 10 may be separately purchased and as such is available in any standard parts catalog. The top surface of the fixture 10 includes a plurality of holes such as 11 located at predetermined known positions on the surface thereof. The location of each of the holes 11 is determined by knowing where a plurality of test points exist on a circuit board to be tested. In each hole as 11 there is mounted a separate pneumatic cylinder 12. Each cylinder 12 is coupled to a pneumatic supply 14 via a suitable tubing arrangement 15. Such tubing may be plastic, rubber or non-conductive tubing and of a diameter sufficient to carry air under a predetermined pressure. The coupling between a cylinder 12 and the pneumatic supply 14 is accomplished via a valve member 16. The valve 16 may be operative in a first position for permitting air to flow into the housing of the cylinder to activate a piston member associated therewith, and in a second position to block the entrance of air and thereby preventing motion of the piston. Such valves are well known in the art.

Certain preselected cylinders 11, as will be explained subsequently, are also wired electrically to a source of signal and power 18. Other preselected cylinders 11 are connected to a measuring apparatus 19, which may for example be a voltmeter, ohmmeter, oscilloscope, or other well known test instruments. The fixture 10 includes a top member 20 which forms a guide for board insertion. As shown by the dashed lines, the top member 20 enables one to slide a board by guiding the same along its edges within the channels formed between the fixture 10 and the guide assembly 20. Such guiding mechanisms and techniques are well known in the art.

Also shown are two set screws 25 which serve to secure the board into position after insertion. Other board retaining equipments may be used as well. A switch 26 having a plunger mechanism 27 serves to engage a circuit board when it is properly inserted and serves to energize both the signal and power supply 18 and the pneumatic source 19. Basically, the test fixture 10, as briefly described above, is similar to many such devices found in the prior art, the major difference being the location and the operation of the pneumatic cylinders.

Such pneumatic or air cylinders 11 have been available and mainly utilized in pneumatic systems such as pneumatically operated machine tools. These cylinders are relatively small and, for example, are available for mounting in a hole having a 5/32 inch diameter. It has been found that by adapting such cylinders, they can be reliably used as component parts of a test fixture to selectively contact test points on a circuit board.

Due to the small cylinder size, it has been found that for frequencies as high as 108 MHz, for example, the cylinders add very little stray capacity and/or inductance to the board and do not disturb the operating characteristics.

Another very advantageous property of the above-described fixtures using such cylinders is that before board insertion all of the cylinders are retracted, and hence there are no contacts and associated pressures to be overcome during the board insertion process. Furthermore, by selectively operating the cylinders according to a predetermined sequence, signals can be injected and detected at various points on the circuit board as desired. When a particular test step or operation is terminated, the associated cylinders are then retracted. This permits the removing of signals and detection devices from the electrical circuits on the circuit board which would otherwise adversely affect other alignment procedures to be performed on the same board.

Figure 2:
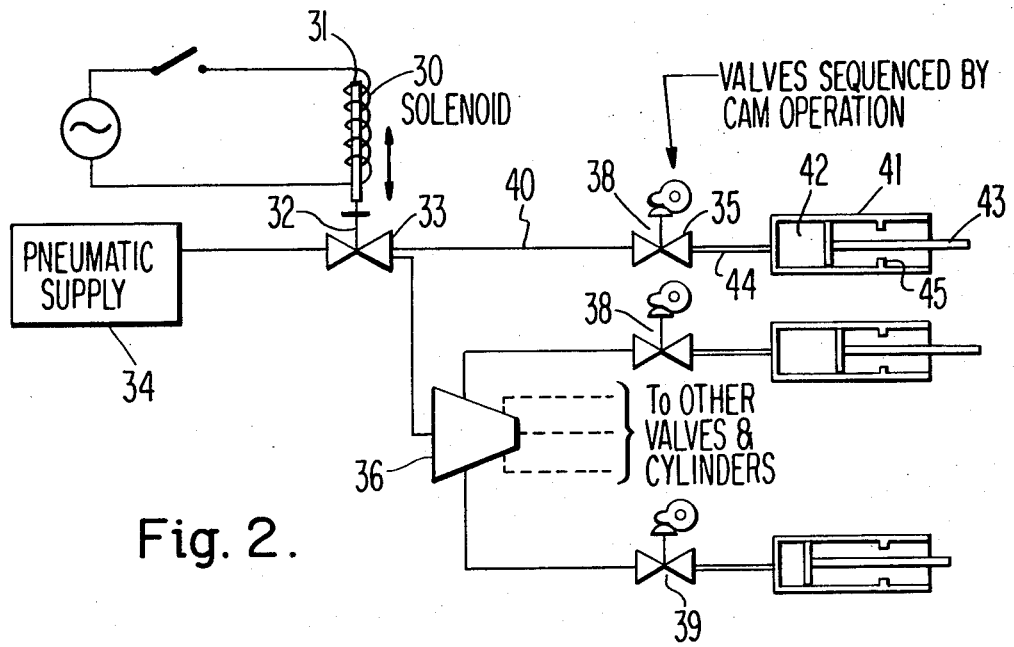
FIG. 2 is a schematic diagram of the cylinder arrangement shown in FIG. 1.

FIG. 2 is a schematic diagram showing a particular cylinder arrangement useful for performing test procedures. A solenoid 30 has a moveable arm 31 surrounded by a coil. The arm 31 is coupled to a valve stem 32 associated with a valve 33 (shown in schematic form). One port of the valve 33 is coupled to a pneumatic supply 34. The other or outlet port of the valve 33 may be coupled directly to an additional valve 35 or to a multi-port manifold unit 36. Manifold 36 then may be coupled to supply high air pressure to a plurality of other valves such as 38 and 39. As indicated above, the inlet port of valve 35 may be coupled by means of a suitable tubing 40 to the outlet port of valve 33 or to one of the outlet ports of a master manifold as 36. The valve 35 has a valve stem 38 which is capable of being operated in a first position for permitting air to flow from the inlet port to the outlet port or in a second position whereby the valve plug blocks such flow. The outlet port of the valve 35 is coupled to a pneumatic cylinder assembly 41. The cylinder assembly 41 is shown in schematic cross section form and basically comprises a cylinder housing 42 inside of which a piston member 43 is slideably mounted.

It can be seen from the schematic that when the valve plug 38 is operated to permit air to flow through the inlet to the outlet port of valve 35, the air thus flowing is applied via the tubing 44 to the cylinder housing of cylinder 41. The pressurized air then causes the piston 43 to move or slide. The stroke of the piston may be determined by suitable stops as 45 located integrally within the cylinder housing. The particular subminiature type cylinders as described above are commercially available with ¼ inch strokes.

Figure 3:
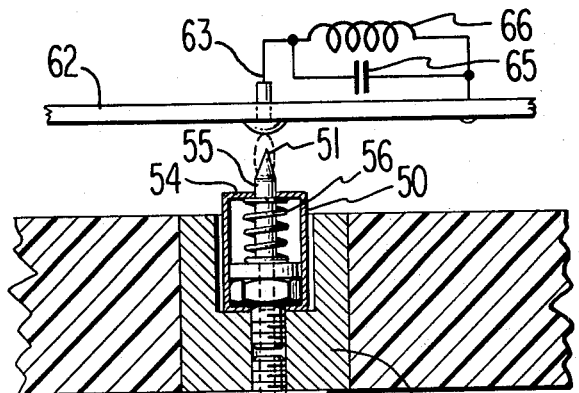
FIG. 3 is a side cross-sectional view taken through a typical pneumatic cylinder assembly.

Referring to FIG. 3, there is shown a cross-sectional view of a pneumatic cylinder useful for implementing the present invention. Basically, the cylinder consists of a cylinder housing 50 having an internal piston accommodating recess in which a piston member 51 is slideably mounted. A cylinder housing inlet port 52 is adapted to accommodate a tubing 53 to which a source of pneumatic pressurized air may be coupled. The top portion of the cylindrical housing 50 has a hole 55 through which the piston 51 may move when air is applied. The hole 55 is surrounded by a flange 56 which serves to limit the stroke of the piston by coacting with a base portion of the piston 51 as can be clearly seen from the figure. The piston 51 may be fabricated from an insulating material or an electrically conductive metal. The top portion of the piston 51 may also be surrounded by a spring member 56 which serves to return the piston to its original position when air is blocked from the inlet port 52 of the cylinder housing.

As shown, the cylinder 50 may be mounted in a hole such as 11 of FIG. 1 preformed on the top surface of the fixture 10 and held in place by means of a chassis nut 60 or other suitable bushing or fastening means. Shown mounted above the cylinder is a circuit board 62 having a test point 63 located thereon. Test point 63 has a bottom section extending from the bottom of the board 62. Shown connected to the test point 63 for purposes of explanation is a resonant circuit including a capacitor 65 in shunt with a coil 66. The operation of the pneumatic cylinder 50 can easily be ascertained from viewing FIG. 3 but will be briefly explained for convenience.

When air under pressure, as designated by the arrow, enters the internal cavity of the cylinder 50, the pressure forces the piston 51 to move upwardly (the upward position shown in dashed lines) which causes the piston 51 to make contact with the test point 63. The body of piston 51 is conductive as is the bushing 73, the solder lug 72, the cylinder wall 50. The wire 70 is attached to the solder lug 72, and when the piston 51 contacts the test point 63, the connection is made to wire 70 via the above-noted components. The wire 70 is thence coupled to, for example, a measuring instrument.

There are a number of other techniques for routing a wire or conductor from the piston 51 as by means of a cap member or by using a conductive piston and so on. Hence, when the piston 51 is moved upwardly by the force of the air flowing through the tubing 53, the wire 70 makes contact with the test point 63. This action applies the potential or signal present at the test point 63 to the measuring apparatus. As soon as the source of air is removed, the spring member 56 serves to retract the piston 51 and thus "breaks" the contact of wire 70 with the test point 63. This leaves the test point completely isolated and unobstructed by any external instrumentation.

Figure 4:
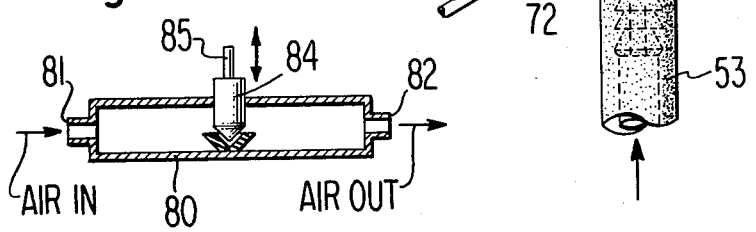
FIG. 4 is a cross-sectional view of a typical valve utilized in such apparatus.

Referring to FIG. 4, there is shown a simple valve assembly which may be utilized in accordance with the embodiments shown herein and particularly as the valves 35, 38 and 39 shown in FIG. 2. The valve has a valve body 80 which has an inlet port 81 at one end and an outlet port 82 at the other end. Each port, 81 and 82, is adapted to accommodate a tubing to permit coupling to a pneumatic source or, in the case of the outlet port 82, to a pneumatic cylinder as shown in FIG. 3. Located within the valve body between the inlet and outlet ports is a valve plug 84 coupled to a valve stem 85. It can be seen that for the position shown, the valve plug 84 prevents air present at the inlet port 81 from flowing to the outlet port 82. It can also be seen that, if the valve plug 84 were lifted by means of the stem 85, pressurized air at the inlet port 81 would flow to the outlet port 82. If port 82 were coupled to a cylinder, this would therefore activate the piston as described in FIG. 3.

Figure 5:
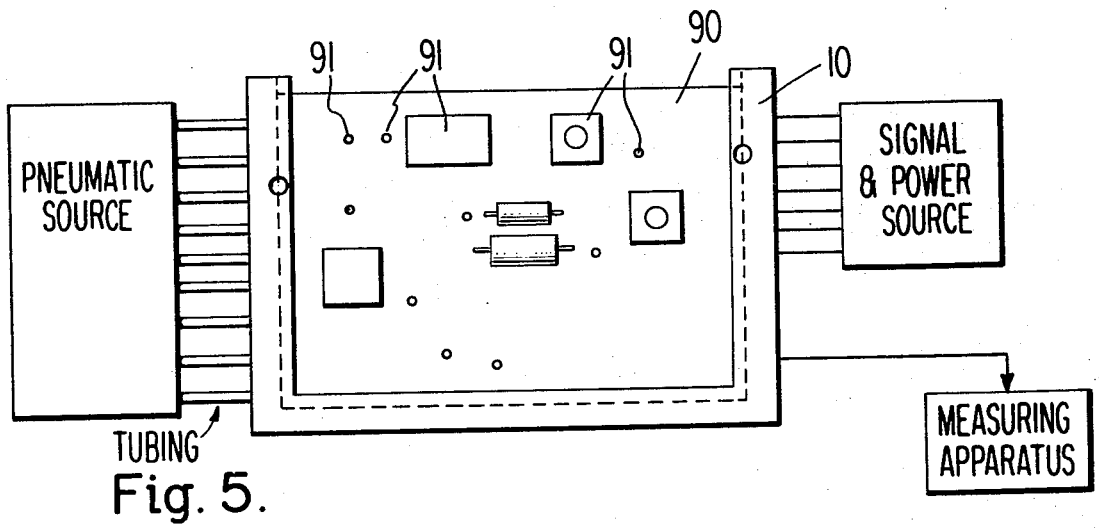
FIG. 5 is a top plan view of a test fixture with a circuit board inserted therein.

FIG. 5 shows the apparatus described in FIG. 1 with a printed circuit board 90 inserted and accommodated by the test fixture 10. A series of dots labeled 91 indicate, the location of various test points performed on the circuit board. Such test point locations determine where the various air cylinders will be placed on the top surface of the fixture 10 and as described in conjunction with FIG. 1.

Figure 6:
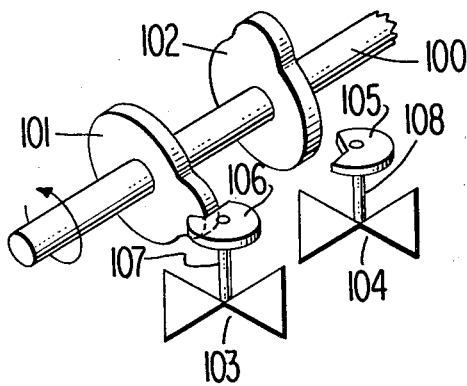
FIG. 6 is a partial plan view of a cam operated sequencer suitable to activate the cylinder arrangements shown herein.

Referring to FIG. 6, there is shown a cam operated sequencing arrangement which may be utilized to activate a plurality of valves as 35, 38 and 39 of FIG. 2 and which may be of the type shown in FIG. 4.

The sequencer basically consists of a shaft 100 which may have one end thereof coupled to a motor, for example, or a gear train driven from a motor, which then serves to rotate the shaft 100 in the direction shown by the arrow encircling the same. Coupled to the shaft is a plurality of cam members such as 101 and 102. Each valve such as 103 and 104 is associated with a separate cam member as 101 and 102. It can be seen from FIG. 6 that, as the shaft is rotated, the extending cam surface of the cam members 101 and 102 will contact corresponding cam surfaces 105 and 106 associated with the valve stems 107 and 108 of the valves 103 and 104. Therefore, as the shaft 100 rotates, the extending cam surface of a cam as 101 serves to raise the valve stem and therefore the valve plug which is coupled thereto and shown, for example, in FIG. 4. This action therefore allows air at the inlet port of a valve to appear at the outlet port. As soon as the extended portion of the cam surface is rotated through the corresponding cam surface associated with the valve stem, the valve plug such as 84 of FIG. 4 serves to again block the inlet and outlet ports.

Thus by using this or any other type of sequencing device, each valve may be operated at the same or at other time intervals, depending upon the coupling of the cams 101 and 102 to the shaft 100. Thus a plurality of test points may be accessed by means of the pneumatic cylinder arrangement shown. The test operation may follow many desired sequences and is operative to interrogate a plurality of predetermined test points located on a circuit board. The fixture shown and described above resolves the typical problem found in the prior art and enables one to position a board without concern with contact pressure and so on, from interfering with such operation. Due to the nature and size of the air cylinders, signals can be applied at any desired location on the board and measurements can be taken in any desired sequence when the board is inserted in the fixture. The utilization of the pneumatic cylinders eliminates transient electrical fields from interfering with circuit operation which transients are sometimes associated with the operation of relay devices of prior art fixtures, both during the energization and de-energization of the relay coils or other electromechanical components.

Due to the fact that a minimum number of test points can be interrogated during any one sequence, the circuitry is not affected as in prior art devices, by a number of contacts which perform no particular function, during this sequence.

What is claimed is:

1. Apparatus for testing an electrical circuit board comprising:
   a. a base member having a top surface including an area thereon congruent with said electrical circuit board, said area having a plurality of holes positioned at predetermined locations each specified with respect to a particular one of a number of test points associated with said electrical circuit board;
   b. a plurality of pneumatic cylinders, each including a piston member fabricated from a conductive material and slideably mounted within a conductive cylinder housing, each of said cylinders being mounted on said base member beneath a separate one of said holes, and adapted to be selectively operated to cause said piston to protrude from said hole when a pneumatic source is applied to said cylinder;

c. means coupled to said cylinders for sequentially and selectively positioning desired combinations of said piston members into contact with said associated test terminals according to a predetermined sequence wherein different desired combinations of said piston members are caused to contact test terminals at different steps of the sequence when said circuit board is placed in congruency with said area of said base member to cause said piston members associated with said holes to coact and make contact with said test points, whereby any electrical signals present at said test points are conducted by said piston members and said conductive cylinder housings;

d. output utilization means coupled to said cylinder housings and responsive to said electrical signals to provide an indication representative of information contained in said signals.

2. A fixture for testing electrical circuit boards, comprising:

a. a base member having a top surface including an area thereon approximately congruent with said circuit board, said area having a plurality of holes located thereon and positioned at predetermined locations on said surface within said area according to a number of test points associated with said circuit board;

b. a plurality of pneumatic cylinders each including a piston housing and a piston member slideably mounted within said housing, said piston member including a conductor adapted for coupling to a measuring instrument to cause a connection between said test point associated with said piston and said instrument when said piston is contacting said test terminal, said housing having a first aperture at one end for accommodating a pneumatic source and a second aperture at said other end to permit said piston to protrude therefrom when said pneumatic source is accommodated, each of said cylinders being mounted on said base member beneath a separate one of said holes with said second aperture surrounded by said hole;

c. a plurality of pneumatic valves each having an inlet port and an outlet port, communicating one with the other via a passageway in the valve body and a selectively operable stop member for blocking said passageway in a first position and opening said passageway in a second position, said inlet ports of said valves adapted for application to a pneumatic source, each of said outlet ports individually coupled to a separate one of said pneumatic cylinders about said first aperture to cause said piston to slide when said stop member of said valve is operated in said second position;

d. sequencing means coupled to said stop members of said valves for operating the same in said second position in accordance with a predetermined sequence to cause said pneumatic source to position desired combinations of said piston members into contact with said associated test terminals, according to said sequence wherein different desired combinations of said piston members are caused to contact test terminals at different steps of the sequence.

3. The fixture according to claim 2 further comprising:

a. means mounted on said surface of said base member for clamping said board in a rigid position when said board is placed in congruency with said area.

4. The fixture according to claim 3 further comprising:

a. first and second track members each having a circuit board accommodating slot, said track members mounted on said top surface of said base member with said slots facing each other and spaced at a distance slightly less than the width of said circuit board, and positioned relatively parallel one to the other for accommodating said board within said area by supporting the same within said slots.

5. The fixture according to claim 3 further comprising:

a. means responsive to the insertion of said circuit board within said area for applying operating potential to a preselected group of conductors associated with said piston members.

* * * * *